United States Patent [19]

Sugiuchi et al.

[11] Patent Number: 4,465,752
[45] Date of Patent: Aug. 14, 1984

[54] ORGANIC PHOTOCONDUCTIVE COMPOSITIONS FOR USE IN ELECTROPHOTOGRAPHY

[75] Inventors: Masami Sugiuchi, Yokohama; Masataka Miyamura, Kamakura; Yasunobu Onishi, Yokohama, all of Japan

[73] Assignee: Tokyo Shibaura Denki Kabushiki Kaisha, Kawasaki, Japan

[21] Appl. No.: 376,101

[22] Filed: May 7, 1982

[30] Foreign Application Priority Data

May 15, 1981 [JP] Japan ................................. 56-72187

[51] Int. Cl.$^3$ .............................................. G03G 5/07
[52] U.S. Cl. ........................................ 430/75; 430/83
[58] Field of Search ....................... 430/70, 71, 72, 75, 430/83

[56] References Cited

U.S. PATENT DOCUMENTS 3,316,087  4/1967  Munder et al. ...................... 430/70
4,047,947  9/1977  Chu et al. ............................... 430/70

FOREIGN PATENT DOCUMENTS 55-53332    4/1980  Japan .
55-111949   8/1980  Japan .
56-155950  12/1981  Japan .

OTHER PUBLICATIONS

Abstract of Japanese Kokai No. 55-111949.
Abstract of Japanese Kokai No. 55-53332.
Partial Translation of Japanese Kokai No. 56-155950.

*Primary Examiner*—John E. Kittle
*Assistant Examiner*—John L. Goodrow
*Attorney, Agent, or Firm*—Schwartz, Jeffery, Schwaab, Mack, Blumenthal & Koch

[57] ABSTRACT

Disclosed are organic photoconductive compositions for use in electrophotography, comprising a polymer containing as main units a naphthalene derivative and/or a naphthacene derivative; and an electron acceptor and/or a sensitizer.

13 Claims, No Drawings

ORGANIC PHOTOCONDUCTIVE COMPOSITIONS FOR USE IN ELECTROPHOTOGRAPHY

BACKGROUND OF THE INVENTION

The present invention relates to organic photoconductive compositions for electrophotography that comprise mainly a novel polymer.

A recording method in which a photoconductive substance is used as a photosensitive material is known for the electrophotography. In summary, the method is an image-forming technique that combines electrostatic and photoconductive phenomena of substance. Namely, a highly insulated layer surface is electrostatically charged in the dark, then the charge is dissipated by raising electric conductivity of the exposed part by way of image-wise exposure. This results in the formation of an electrostatic latent image at the non-exposed part, which is then developed, for instance, by contacting it with a colored powder or toner to give a visible image.

Prior art photoconductive layers containing a photosensitive material assembled in electrophotographic copying machines comprise chiefly an organic or inorganic photoconductive material.

Inorganic photoconductive materials are exemplified, for instance, by selenium, zinc oxide, titanium oxide and cadmium sulfide. Although they have a superior photosensitive property, they are inferior having regard to transparency, flexibility, light weight, film-forming property, smooth surface and price. Selenium, in particular, has a disadvantage regarding the toxicity.

On the other hand, organic photoconductive materials are exemplified by condensed polycyclic aromatic compounds such as anthracene, pyrene and perylene, heterocyclic compounds such as pyrazoline derivatives, imidazole derivatives and oxazole derivatives, and polymeric compounds such as poly-N-vinylcarbazole and polyvinylanthracene. They are superior to the above-mentioned inorganic photoconductive materials having regard to transparency, flexibility, light weight, film-forming property, smooth surface and price, hence have extensively been studied for the recent years.

Photosensitive materials containing an organic photoconductive compound, however, have mostly quite a poor photosensitivity as compared with those containing an inorganic photoconductive material such as selenium and zinc oxide, hence only a few of them are practically employed. One of them comprises poly-N-vinylcarbazole (PVK), chemically sensitized with 2,4,7-trinitro-9-fluorenone (TNF). Although it is a photoconductive material having superior properties such as photosensitivity, darkdecay rate, stability and reproducibility, it has a disadvantage owing to the toxicity of TNF.

Further attempts have been made to improve photosensitivity by the combination of an organic photoconductive compound and a dye sensitizer. However, products thus obtained involve practical problems to be overcome such as poor darkdecay rate and reproducibility over a long period of time due to the instability.

SUMMARY OF THE INVENTION

The object of the invention is to provide photoconductive materials having also a superior photosensitivity, aiming at advantages such as superior transparency, flexibility, light weight, film-forming property, smooth surface and low price that organic photoconductive materials have. In other words, the object of the invention is to provide organic photoconductive materials having a high sensitivity, low darkdecay rate, well-reproducible photosensitivity during and after repeated use over a long period of time, and good safety or low toxicity.

According to the invention, there is provided organic photoconductive compositions for electrophotography comprising the following components (A) and (B):

(A) A polymer having molecular weight of from $10^3$ to $10^6$ containing as main units a naphthalene derivative represented by the formula (I) and/or a naphthacene derivative represented by the formula (II):

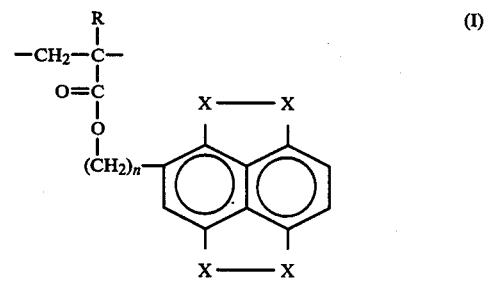

(I)

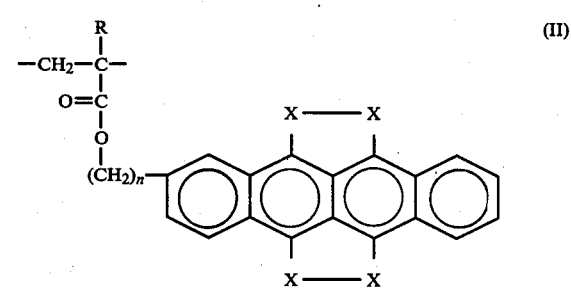

(II)

(wherein, R represents a hydrogen atom or a methyl group; n is an integer of from 0 to 3; and X represents a sulfur or selenium atom); and (B) an electron acceptor and/or a sensitizer.

DETAILED DESCRIPTION OF THE INVENTION

Compounds of formula (I) may be prepared by an esterification of an acrylic or methacrylic acid chloride represented by the formula (III) with a 2-hydroxy- or 2-hydroxyalkyl-substituted naphthalene or naphthacene represented by the formula (IV) or (IV'). Then, the resulting acrylic or methacrylic ester represented by the formula (V) or (V') is subjected to block polymerization or suspension polymerization, solely or in combination with other copolymerizable monomer, in the presence of azobisisobutyronitrile as the catalyst to give a polymer. Finally, the thus obtained polymer is reacted with sulfur or selenium in trichlorobenzene, affording the desired polymer.

In the final step, about 90% of the naphthacene ring may be converted to tetrathionaphthacene or tetraselenonaphthacene ring according to the present invention. Similar results may be obtained also in the case of naphthalene ring.

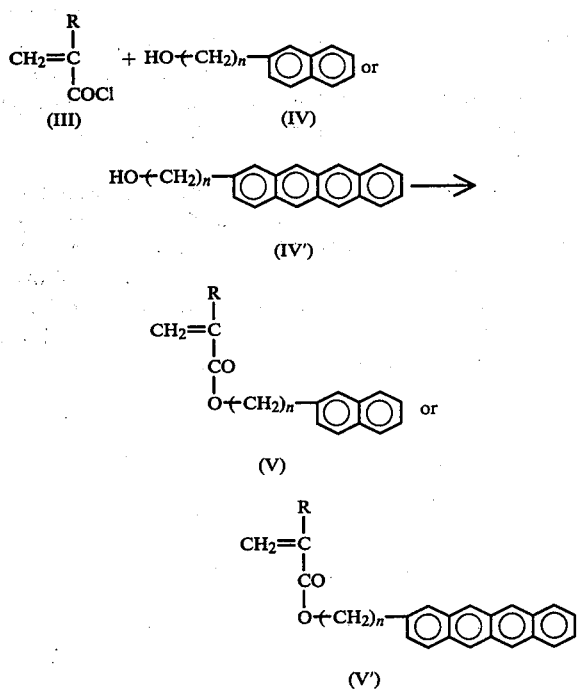

As mentioned above, the polymer (A) may be either a homopolymer or a copolymer.

Naphthalene derivatives to be employed in the invention include tetrathionaphthalene acrylate, tetrathionaphthalene methacrylate, tetrathionaphthomethyl acrylate, tetrathionaphthomethyl methacrylate, 2-tetrathionaphthoethyl acrylate, 2-tetrathionaphthoethyl methacrylate, 3-tetrathionaphthopropyl acrylate and 3-tetrathionaphthopropyl methacrylate.

Naphthacene derivatives to be employed in the invention include tetrathionaphthacene acrylate, tetrathionaphthacene methacrylate, tetrathionaphthacenomethyl acrylate, tetrathionaphthacenomethyl methacrylate, 2-tetrathionaphthacenoethyl acrylate, 2-tetrathionaphthacenoethyl methacrylate, 3-tetrathionaphthacenopropyl acrylate and 3-tetrathionaphthacenopropyl methacrylate.

Copolymerizable monomers are unsaturated ethylenic compounds and are exemplified by alkyl acrylates, alkyl methacrylates, styrene, vinyl chloride, vinyl acetate and acrylonitrile. The amount of such copolymerizable monomers in copolymers should preferably be kept up to 20 molar % in view of photoconductivity.

Electron acceptors to be employed in the present invention include, for example, inorganic compounds such as iodine, bromine, antimony pentachloride, zinc chloride, iron chloride, aluminium chloride, boron trifluoride and indium chloride; quinones such as p-benzoquinone, o-chloranil, p-chloranil, o-bromanil, p-bromanil, 2,3-dichloro-5,6-dicyano-p-benzoquinone, 2,6-dinitro-p-benzoquinone, tetracyano-p-benzoquinone, 2,3-dicyano-p-benzoquinon, trichloro-p-benzoquinone, 2,6-dichloro-p-benzoquinone, 2,5-dichloro-p-benzoquinone, 2,3-dichloro-p-benzoquinone, monochloro-p-benzoquinone, 2,5-dimethyl-p-benzoquinone, methyl-p-benzoquinone, 1,2-naphthoquinone, 1,4-naphthoquinone, 9,10-anthraquinone and 9,10-phenanthrenequinone; nitro compounds such as 1,3-dinitrobenzene, 1,3,5-trinitrobenzene and tetranitromethane; and tetracyanoethylene, tetracyanoquinodimethane and 2,4,7-trinitro-9-fluorenone.

Sensitizers to be employed in the present invention may be those commonly used in electrophotography. They include photosensitizers or dyes represented by methylene blue, crystal violet, rhodamines such as Rhodamine G and Rhodamine 6G, and Victoria blue; and chemical sensitizers such as maleic acid, phthalic acid, itaconic acid, benzoic acid and acid anhydrides of these acids, p-nitrophenol, o-nitrophenol, 4-chloro-2-nitrophenol and tetrachlorobisphenol A.

Preferred mixing rate of the compositions according to the present invention will be described hereunder.

Where an electron acceptor is employed, 1 to 10 moles of the polymer (A) (calculated in terms of the monomer I or II) are blended with 1 mole of the electron acceptor. Presence of 1 mole or less of the polymer (A) will result in a poor film-forming property, whereas presence of 10 moles or more thereof will result in a poor photoconductive property due to an insufficient formation of the charge-transfer complex.

Where a sensitizer is employed, 1 to 10 ml of a 1% by weight solution of a photosensitizer or 1 to 10 g of a chemical sensitizer are blended with 10 g of the polymer (A). Presence of a photosensitizer or a chemical sensitizer beyond the concentration will result in a poor film-forming property, whereas presence thereof below the concentration will result in an insufficient sensitization.

The compositions according to the invention may contain a binder resin, if necessary. This is particularly preferable if the film-forming property of the composition consisting only of the polymer (A) and the electron acceptor is poor.

Such binder resins include, for instance, poly(styrene), poly(vinyl chloride), vinyl chloride/vinyl acetate copolymer, poly(vinyl acetate), poly(vinyl acetal), phenolic resins, epoxy resins and alkyd resins. Incorporation into the composition of such a binder resin should be kept at 10% or less in order to attain a good photosensitivity.

In order to prepare the photoconductive compositions for electrophotography according to the present invention, a solution of a polymer (A), an electron acceptor and/or a sensitizer, and a binder resin if required, at a suitable mixing rate is coated on a conductive support such as aluminium plate, then dried.

The coating solution may be prepared by various ways. For example, a polymer (A) and an electron acceptor are dissolved in a suitable solvent, while a binder resin is dissolved in the same or different kinds of solvent, and finally the both solutions are blended. Such solvents include, for instance, benzene, trichlorobenzene, nitrobenzene, acetone, methanol, methylene chloride, trichloroethylene, carbon tetrachloride, methyl cellosolve, tetrahydrofuran, dioxane, dimethylformamide, dimethylacetamide, dimethyl sulfoxide and N-methylpyrrolidone.

The amount of the organic photoconductive composition of the present invention to be coated on a support is not critical. Usually, it is coated on a support so that a dried film having a 1 to 30 μm thickness may be obtained.

In order for the thus prepared photosensitive material to be applied for electrophotography, the photoconductive layer comprising the photosensitive material may be processed according to the conventional electrophotographic processes such as electrification, imagewise exposure and development transfer.

The organic photoconductive compositions for electrophotography according to the invention described above have a superior photosensitivity, at the visible range, which is comparable to that of the known poly-N-vinylcarbazole chemically sensitized with 2,4,7-trinitro-9-fluorenone.

The compositions have a low darkdecay rate and a good stability that allows to produce images having a superior reproducibility even after the repeated use over a long period of time. Further, materials to be employed have no toxicity, hence may be used safely.

The present invention will be explained by the following working examples which by no means limit the scope of the invention.

EXAMPLE 1

10.0 g of 2-hydroxynaphthacene and 4.2 g of pyridine were added to 150 ml of toluene, then 5.5 g of methacryloyl chloride were added dropwise at 10° C. over 1 hour. Upon completion of addition, the mixture was stirred at room temperature for 5 hours. The solution was washed, in turn, with water and an aqueous alkaline solution, then dried over sodium sulfate. By removing the solvent by distillation, there was obtained methacrylic acid ester of 2-hydroxytetracene at 92% yield.

A mixture of 5.0 g of the methacrylic acid ester, 0.5 g of azobisisobutyronitrile, 2.0 g of polyvinyl alcohol and 100 ml of water was refluxed, with stirring, at 90°–95° C. for 2 hours under nitrogen stream. After allowing to cool to room temperature, precipitates were collected by filtration and the solid product was washed with a warm water and dried. The product was purified by reprecipitation with tetrahydrofuran and methanol.

Yield, 4.3 g (86%);

Number average molecular weight, 190,000 (gel permeation chromatography with a standard poly(styrene)).

2.9 g of the polymer and 4 g of sulfur were added to 150 ml of trichlorobenzene and the mixture was refluxed for 24 hours to complete the reaction. Precipitates were collected by filtration and the resulting solid was washed and dried. It was confirmed by NMR spectroscopy and others that 88% of the naphthacene ring were converted to tetrathiotetracene ring.

Number average molecular weight, 280,000 (gel permeation chromatography with a standard poly(styrene));

Glass transition point, 121.0° C.;

IR, 800 cm$^{-1}$ (C-S), 490 cm$^{-1}$ (S-S).

1 g of the polymer thus prepared and 0.3 g of tetracyanoethylene were dissolved in a 1:1 mixture of toluene and trichlorobenzene to give a uniform solution, which was coated on Mylar (Trademark for a polyester film) on which aluminium had been vacuum evaporated to give a thickness of 2–8 μm and dried.

Electrification and decay of the film thus obtained were determined with an electrostatic paper analyzer. The result was 7.5 lux sec. when the sensitivity was represented in terms of exposure amount (unit: lux sec.) necessary for the initial surface electric charge to be decayed by ½. The photosensitive films were prepared subjected to repeated electrification and exposure 5,000 times in the same conditions as above, after which no abnormality was observed, thus suggesting the superior fatigue resistance.

EXAMPLE 2

10 g of the polymer employed in Example 1 and 1 g of bis(5-chloro-2-hydroxyphenyl)methane as the chemical sensitizer were added to trichlorobenzene, then 2 ml of 1% solution of Crystal Violet in dimethylformamide were added. The solution was coated on Mylar on which aluminium had been vacuum evaporated, and dried. Measurement of the sensitivity of the film thus obtained performed in the similar manner as in the above-mentioned Example showed the value 7.1 lux sec. The films prepared were then subjected to repeated electrification and exposure 5,000 times in the similar manner as in the above-mentioned Example, after which no fatigue that would affect practical use was observed.

As specifically described above, the novel organic photoconductive compositions according to the invention possess superior electrification properties such as low darkdecay rate, as well as superior photosensitive properties such as low half-life exposure amount. Such superior properties may be maintained during their use over a long period of time.

COMPARATIVE EXAMPLE 1

In comparison with the photosensitive film of the invention, 0.8 g of PVK and 1 g of TNF were dissolved in 18 ml of o-dichlorobenzene to give a uniform solution, which was coated on Mylar on which aluminium had been vacuum evaporated to give a thickness of 3–10 μm, and dried.

In the same manner as in Example 1, the sensitivity measurement of the PVK-TNF film was performed. The result was 7.0 lux sec. This film was subjected to repeated electrification and exposure in the same conditions as above, but, after 1,000 time repetitions, abnormality was observed.

As seen from the foregoing, the photosensitive film according to the invention, having no toxicity as in the case of the PVK-TNF film, has a good photoconductivity comparable to that of the PVK-TNF film, and has far better reproducibility over a long period of time than the PVK-TNF film.

We claim:

1. Organic photoconductive compositions for electrophotography comprising a polymer having molecular weight of from $10^3$ to $10^6$ containing as main units a naphthalene derivative represented by the formula (I) and/or a naphthacene derivative represented by the formula (II):

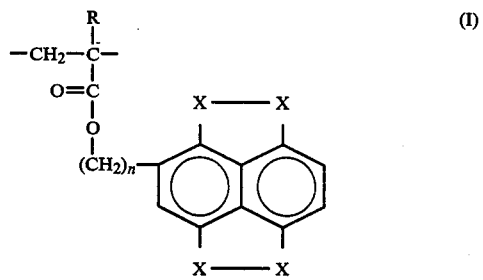

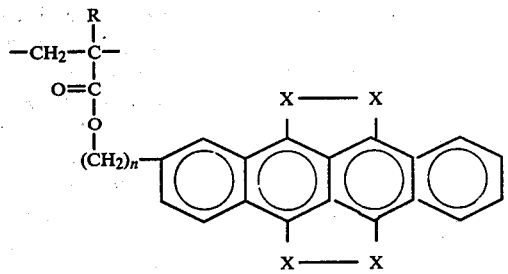

wherein R represents a hydrogen atom or a methyl group, n is an integer of from 0 to 3, and X represents a sulfur atom or a selenium atom;

and an electron acceptor and/or a sensitizer, the proportion of said polymer to said electron acceptor ranging from 1 to 10 moles of the former per 1 mole of the latter.

2. The composition according to claim 1, wherein X represents a sulfur atom.

3. The composition according to claim 1, wherein said naphthalene derivative is selected from the group consisting of tetrathionaphthalene acrylate, tetrathionaphthalene methacrylate, tetrathionaphtomethyl acrylate, tetrathionaphthomethyl methacrylate, 2-tetrathionaphthoethyl acrylate, 2-tetrathionaphthoethyl methacrylate, 3-tetrathionaphthopropyl acrylate and 3-tetrathionaphthopropyl methacrylate.

4. The composition according to claim 1, wherein said naphthacene derivative is selected from the group consisting of tetrathionaphthacene acrylate, tetrathionaphthacene methacrylate, tetrathionaphthacenomethyl acrylate, tetrathionaphthacenomethyl methacrylate, 2-tetrathionaphthacenoethyl acrylate, 2-tetrathionaphthacenoethyl methacrylate, 3-tetrathionaphthacenopropyl acrylate and 3-tetrathionaphthacenopropyl methacrylate.

5. The composition according to claim 1, wherein said polymer is further added with other unsaturated copolymerizable ethylenic monomer selected from the group consisting of alkyl acrylate, alkyl methacrylate, styrene, vinyl chloride, vinyl acetate and acrylonitrile.

6. The composition according to claim 5, wherein said copolymerizable monomer in the copolymer to be produced is not more than 20 molar %.

7. The composition according to claim 1, wherein said electron acceptor is selected from the group consisting of o-chloranil, 2,3-dichloro-5,6-dicyano-p-benzoquinone, tetracyanoethylene and tetracyanoquinodimethane.

8. The composition according to claim 1, wherein said sensitizer is a dye selected from the group consisting of methylene blue, crystal violet, rhodamine and victoria blue.

9. The composition according to claim 1 or 8, wherein 1 to 10 ml of 1% by weight solution of said dye is blended with 10 g of said polymer.

10. The composition according to claim 1, wherein said sensitizer is a chemical sensitizer selected from the group consisting of maleic acid, phthalic acid, itaconic acid, benzoic acid and acid anhydride of these acids.

11. The composition according to claim 1 or 10, wherein 1 to 10 g of said chemical sensitizer is blended with 10 g of said polymer.

12. The composition according to claim 1, wherein the composition further includes a binder resin in an amount of not more than 10% based on the composition.

13. The composition according to claim 12, wherein said binder resin is selected from the group consisting of poly(styrene), poly(vinyl chloride), vinyl chloride/vinyl acetate copolymer, poly(vinyl acetate), poly(vinyl acetal), phenolic resins, epoxy resins and alkyd resins.

* * * * *